3,174,781
SEPARABLE COUPLING
Everett J. Eastman, Baltimore, Md., assignor, by mesne assignments, to the United States of America as represented by the Secretary of the Air Force
Filed Sept. 6, 1962, Ser. No. 221,924
1 Claim. (Cl. 287—103)

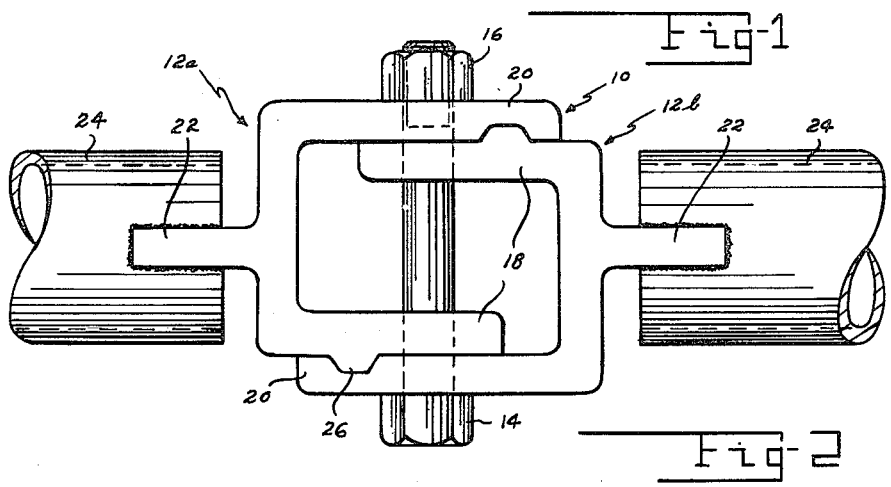
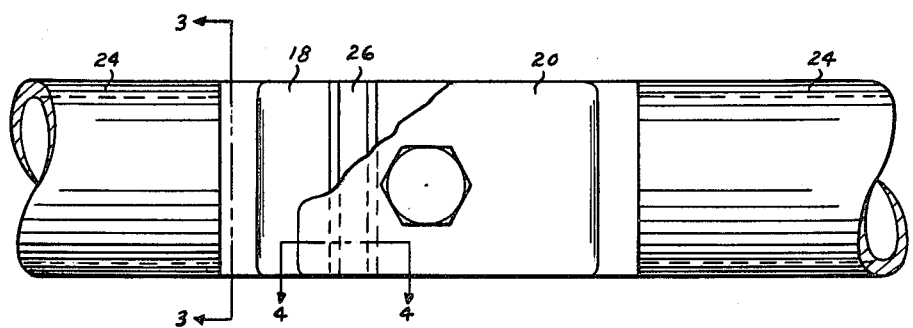
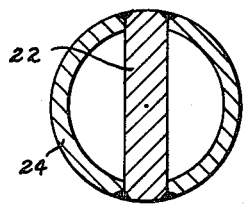
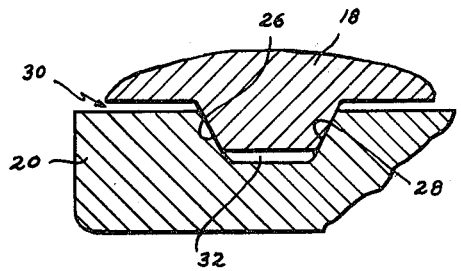
INVENTOR.
EVERETT J. EASTMAN

This invention relates to coupling devices used primarily to join various structural sections of portable or knock-down structures such as high scaffolding and radar antenna structures, although it is equally useful in applications where only one or a few sections of a multisection structure must be separated on occasion. A coupling made in accordance with this invention may be integral with the structural sections to be joined; or it may be made separate therefrom and provided with a heel or other means for attaching to a structural section.

The coupling may be made of any suitable material. The coupling, when not integral with the structural sections to which joined, may be easily made by sawing the coupling halves from an extruded form having a transverse cross section as shown on FIG. 1.

The primary object of this invention is to provide a rigid separable coupling for connecting two separable sections with a rigidity approaching the rigidity of a monostructure.

Another object of this invention is to provide a separable coupling in which the load is carried by the coupling structure itself and not by a bolt or pin.

A further object of this invention is to provide a separable coupling having two identical halves for economy of manufacture.

Additional objects, advantages and features of the invention reside in the construction, arrangement and combination of parts involved in the embodiment of the invention as will appear from the following description and accompanying drawings wherein:

FIG. 1 is a plan view of the separable coupling welded between two tube ends.

FIG. 2 is a side elevation of the coupling partially broken away to show the tongue on one coupling half.

FIG. 3 is a section on line 3—3 of FIG. 2 showing the manner of joining the coupling to the tube.

FIG. 4 is an enlarged section on line 4—4 of FIG. 2 showing the contact areas and clearance between the coupling halves.

Referring to the drawings, the separable coupling referred to generally as 10 comprises two identical forked coupling halves 12a and 12b which are in sliding engagement where they are held in place by bolt 14 and nut 16. Each forked coupling half has a first tine 18 and a second tine 20 in spaced parallel relationship on opposing sides of the longitudinal center line through the coupling.

On applications where the coupling is not to be formed integral with the structural sections to which joined, means may be provided to join the coupling halves to the structural sections. The joining may be by welding, brazing, screwing, bolting, riveting or other suitable means. As shown by the drawings of the disclosed embodiment, each coupling half has a heel 22 which is shown welded to a slot in the end of tubes 24.

Tine 18 on each coupling half has a male element 26 transverse to the longitudinal center line which engages a female element 28 in tine 20. The male element may be in the form of a tongue having straight sides, or taper sides as shown. It may also be made of arcuate or elliptical form without departing from the invention.

As best shown on FIG. 4, the two coupling halves are in sliding engagement with the tapered sides of the male element 26 on one coupling half engaging the tapered sides of the female element 28 of the opposite like coupling half. The elements are sized to provide side clearances 30 and 32, as shown on FIG. 4.

When the bolt 14 is passed through suitable holes in the coupling halves and nut 16 is tightened, the male and female elements are drawn into firm contact to provide an extremely rigid nonpivoting coupling.

It is to be understood that the embodiment of the present invention as shown and described is to be regarded as illustrative only and that the invention is susceptible to variations, modifications and changes within the scope of the appended claim.

I claim:

A separable coupling comprising two substantially identical forked coupling halves each having tines releasably interconnected against relative movement with the tines of the other coupling half on a longitudinal axis extending through said coupling, and elongated removable holding means extending through the tines of said coupling halves on a longitudinal axis transverse to the longitudinal axis of said coupling for holding said coupling halves in the interconnected position, each of said coupling halves having a first and a second tine in longitudinally parallel spaced relationship on opposing sides of the longitudinal axis of said coupling, said first tine on the engaging face thereof having an elongated straight male element with planar engaging surfaces longitudinally located on said first tine to be on one side of said elongated holding means on an axis transverse to the longitudinal axes of said coupling and said holding means, said second tine on the opposing engaging face from said first tine having an elongated straight female element with planar engaging surfaces complementary to the planar engaging surfaces on the male element and longitudinally located on said second tine to be on the opposite side of said elongated holding means from said male element on an axis transverse to the longitudinal axes of said coupling and said holding means, the tines of the two coupling halves being in interdigitated interconnected engagement with the male element on one coupling half engaging the female element on the other coupling half for locking said coupling halves on both sides of said holding means into axial load transmitting engagement relieving said holding means of all shear and for preventing pivoting of said coupling halves about said holding means.

References Cited by the Examiner
UNITED STATES PATENTS

| | | | |
|---|---|---|---|
| 594,043 | 11/97 | Thompson | 287—103 |
| 1,094,020 | 4/14 | Robinson | 287—101 |
| 1,514,652 | 11/24 | Burmaster | 287—103 |
| 1,887,913 | 11/32 | Bell | 287—103 |
| 2,584,451 | 2/52 | Hopp | 287—99 |
| 3,066,348 | 12/62 | Trapman | 287—100 |

FOREIGN PATENTS

| | | |
|---|---|---|
| 512,175 | 8/39 | Great Britain. |
| 641,432 | 11/97 | Great Britain. |
| 334,776 | 1/59 | Switzerland. |

CARL W. TOMLIN, *Primary Examiner.*